United States Patent [19]

Morris

[11] Patent Number: 4,616,950
[45] Date of Patent: Oct. 14, 1986

[54] TIMBER JOINING DEVICES

[76] Inventor: Tom C. Morris, 10416 Wood Dale, Dallas, Tex. 75228

[21] Appl. No.: 575,690

[22] Filed: Jan. 31, 1984

[51] Int. Cl.[4] .......................... F16B 7/04; F16B 39/10
[52] U.S. Cl. .................................. 403/231; 403/232.1; 403/262; 403/383; 403/405.1; 411/123; 256/65
[58] Field of Search ..................... 403/232.1, 199, 187, 403/262, 230, 403, 231, 312, 300, 383, 408, 405; 411/90, 91, 92, 93, 94, 97, 124, 123, 122, 119; 256/65, 66, 67

[56] References Cited

U.S. PATENT DOCUMENTS

| 601,463 | 3/1898 | Feltgen | 411/123 |
| 1,083,404 | 1/1914 | Kenyon | 403/262 |
| 1,485,629 | 3/1924 | Seeger | 403/262 |
| 1,537,834 | 5/1925 | Lally | 403/232.1 |
| 2,340,924 | 2/1944 | Boye | 403/406 |
| 4,471,947 | 9/1984 | Osborne | 256/65 |

FOREIGN PATENT DOCUMENTS 794410 12/1935 France ............................... 403/262

Primary Examiner—Cornelius J. Husar
Assistant Examiner—Peter M. Cuomo
Attorney, Agent, or Firm—E. Thomas Wheelock

[57] ABSTRACT

The invention deals with devices suitable for securely joining the end of a timber to another member. Shallow U-shaped channels are placed on the outside of a support frame which lies along the longitudinal axis of the timber near its end. A frame end forms the end of the support frame and is fastened to the other member.

18 Claims, 11 Drawing Figures

FIG.2A
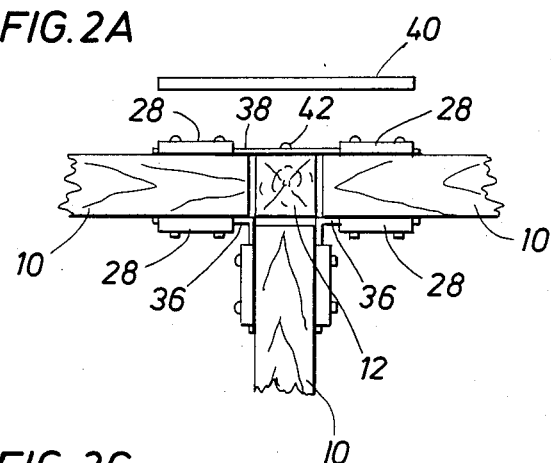
FIG.2B
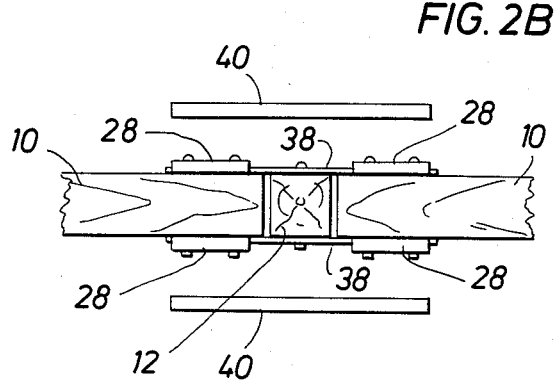
FIG.2C
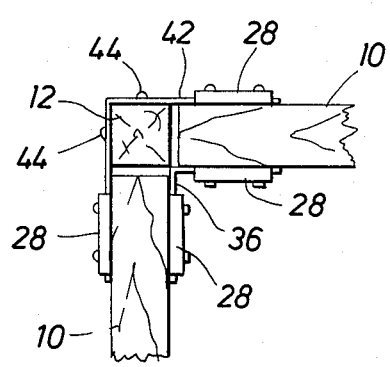
FIG.2D
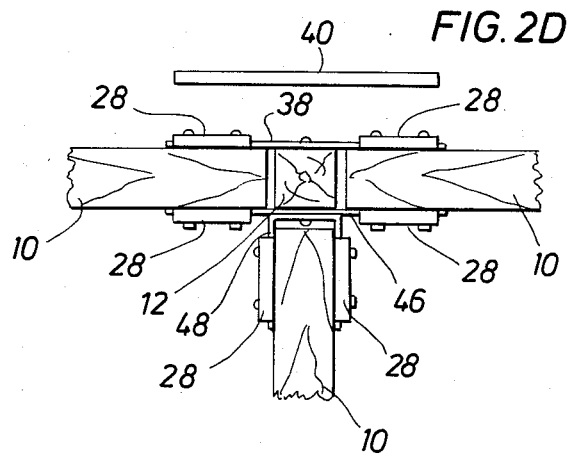
FIG.2E
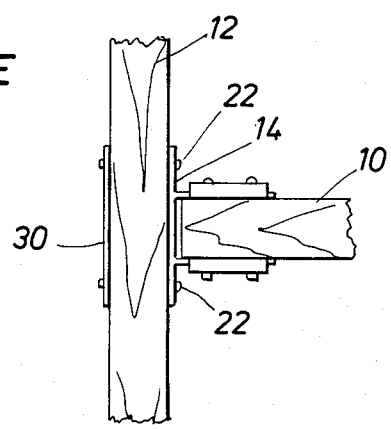
FIG.2F
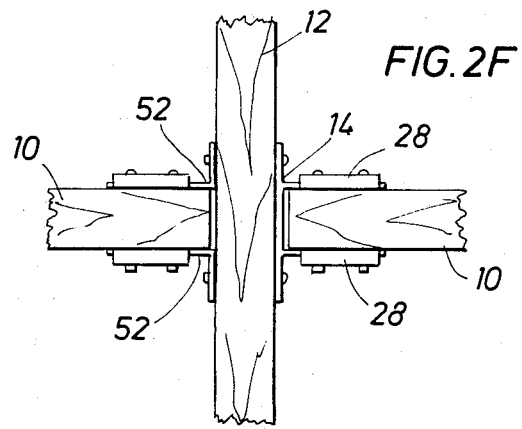
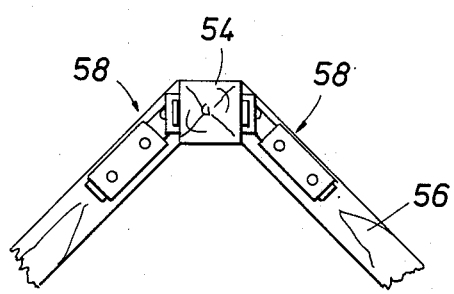
FIG.2G
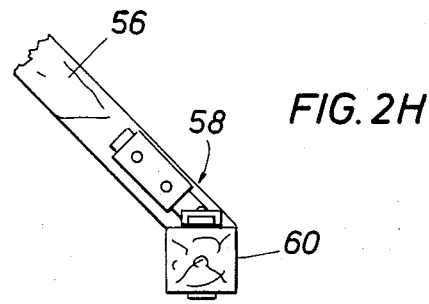
FIG.2H

TIMBER JOINING DEVICES

FIELD OF THE INVENTION

This invention deals with devices suitable for securely joining timbers to other elements. They may be used as the framework of wood fences, housing, or other structures requiring such timbers. The joining devices use shallow U-shaped channels placed on the outside of a support frame and bolted or otherwise fastened to the timbers to provide stability and rigidity to the resulting joints.

BACKGROUND OF THE INVENTION

There are many recognized methods of joining large timbers together to form various structures. For instance, barns and houses built in New England have used tongue and grooves cut from the wood to maintain rigidity of the structure. Log cabins typically gain structural rigidity by the use of generally flat-sided logs having interconnecting notches near the vertical edges of the building. Cross-posts between vertical posts on wooden fencing are often joined by toe-nails, support blocks, or simple L-shaped brackets.

Another more sophisticated joint for jointing straight segments of a dome-shaped structure is disclosed in U.S. Pat. No. 3,635,509 to Birkemeier et al, issued Jan. 18, 1972. The disclosed structure includes a number of beams connected together in triangles by bolted joints. The joints each have a pair of straps bolted to the ends of the beams. Other bolts in the straps pass through clearance notches which are welded in the ends of a short section of tubing. These additional bolts pass through and bear against the inner periphery of the tube.

The straps connected to the wooden beams as disclosed in Birkemeier et al are not U-shaped and consequently lack the structural integrity found in the instant invention.

Another geodesic dome using flat straps to connect its integral wooden beams is disclosed in U.S. Pat. No. 4,260,276 to Phillips, issued Apr. 7, 1981. Six sets of paired flat straps are welded to a tapered hexagonal ring. Each pair of straps is bolted through a timber so that the timber butts against the ring. Six timbers are joined at the hexagonal ring.

Phillips does not suggest the use of a shallow U-shaped channel in contact with the timbers nor does it disclose a support frame such as the one integral in this invention.

A final timber connector used to connect the wooden joists making up a geodesic dome is disclosed in U.S. Pat. No. 4,262,461 to Johnson et al, issued Apr. 21, 1981. The Johnson connector is made up of a central metal sleeve or cylinder having six pairs of circumferentially spaced openings and a set of six tongue members which are bolted to the ends of the timbers. The tongue members have flat sides and the attaching bolts pass through both flat sides and the timber. Each tongue member has a pair of protrusions at the end of the timber which pass through two of the openings in the central metal sleeve. A tapered pin is inserted through each sleeve member protrusion as it passes through the sleeve. The pin holds the timber in place.

Johnson et al does not suggest the use of shallow U-shaped channels in contact with the timbers nor any other part of the disclosed invention.

The disclosure in U.S. Pat. No. 4,318,628 to Mancini, issued Mar. 9, 1982, shows a device for joining wooden panels. The devices each use a number of joined deep U-shaped channels having spikes placed at the bottom of each channel. The channels may be joined at, e.g., 90° angles so that when panels are inserted into those channels, the panels meet at 90°.

Mancini does not suggest using a pair of shallow U-shaped channels bolted on the opposite sides of a large timber. The Mancini device does not use a supporting framework to position and hold the channels.

None of the timber joining devices shown in the prior art discloses or suggests the devices claimed herein nor any portion of those devices.

SUMMARY OF THE INVENTION

This invention generally relates to timber joining devices. The device has two major parts. The first part is a shallow U-shaped channel supported by the second part, the frame. In some variations of the invention, a U-shaped channel may form a portion of the frame. The U-shaped channels, whether discrete or integral with the frame, are installed so that the open side of the channel is placed toward the timber. The channels and the support frame are preferably cross-bolted through the timber.

The invention may take any form needed to join a timber to a plate or one or more timbers. For instance, the device may take the form of a "T" in joining an upper cross piece with a fence post planted in the ground. The other fence timber joints, e.g., corners with two cross pieces mounted in mid- or top of fence post, joints where three or four cross pieces joins a single fence post either at mid- or high fence post. The channels may be mounted on upper and lower positions of the timbers (if one were to install pickets on the timbers) or on opposite sides of the timbers.

Another variation permits the use of the device at other than the typical right angles found in a fence. For instance, the inventive device may be used to join the joists to the ridge piece in a house. The joists may also be joined at the eaves to the walls using the disclosed invention.

The device may be used on timbers having any cross section, e.g., round, square, or slab sided and will work with raw logs.

BRIEF DESCRIPTION OF THE DRAWINGS

FIGS. 2A–2D show various embodiments of the inventive connectors in top view.

FIGS. 2E and 2F show two embodiments of the connectors in side view.

FIGS. 2G and 2H show, in side view, embodiments for joining timbers at an angle other than a right angle as, for instance, in a house or cabin.

DESCRIPTION OF THE PREFERRED EMBODIMENTS

Figure 1A:
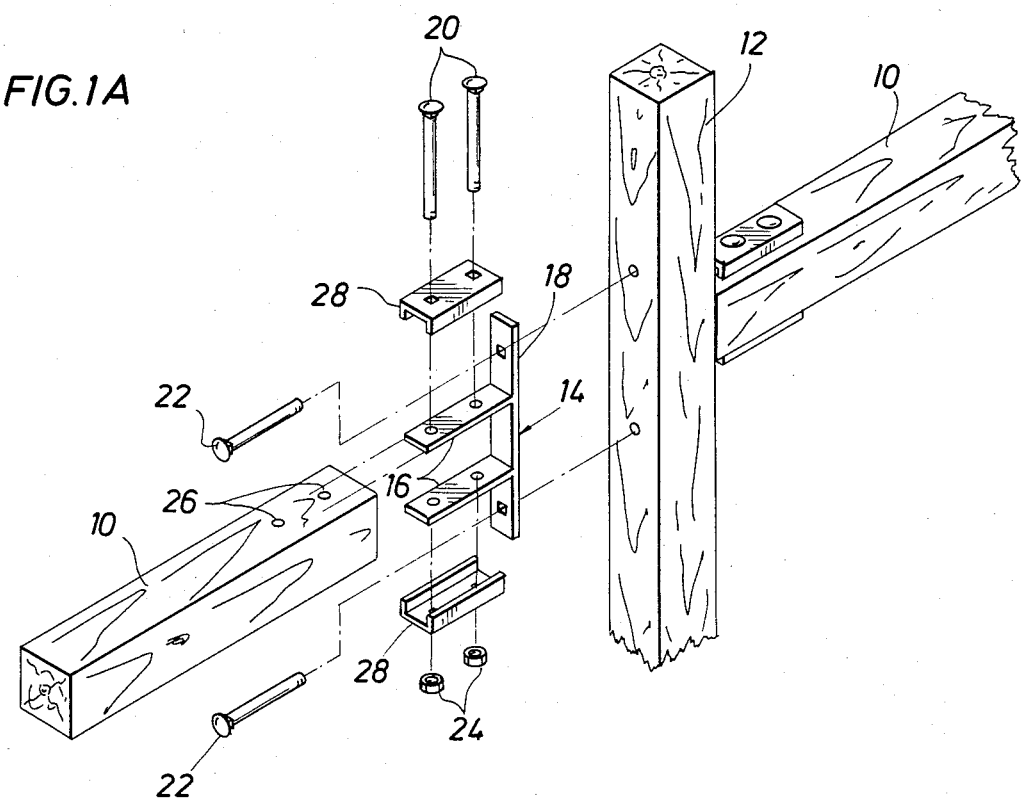
FIG. 1A shows an exploded isometric view of a typical T connector.

FIG. 1A shows one variation of the invention in which two cross-pieces 10 are joined to a vertical post 12. This drawing illustrates the parts of the inventive timber-joining device and the manner in which they interconnect. The comments concerning the operation of this variation are, as well, applicable to the other variations discussed below.

The first major part of the device shown in FIG. 1A is the support frame 14. Frame 14 has three flat portions, i.e., two arms or flats 16 which are generally parallel to each other and a third flat 18 to which the first two flats are joined. Flats 16 have a set of matching holes to accept cross bolts 20 through cross-piece 10. Similarly, flat or end piece 18 has a pair of holes suitable for accepting cross bolts 22. For ease of assembly, cross bolts 20 and 22 may be carriage bolts having square shanks near the bolt head. If the cross bolts are carriage bolts, certain of the holes in the device may be square (see, for instance, those illustrated in flat 18). In this way, the nuts 24 which fit on the end of the various cross bolts may be installed using a single wrench.

The support frame 14 may be constructed in a number of ways. For instance, flats 16 may be welded to flat 18. Frame 14 may be a section sawn out of a longer "$\pi$"-shaped extrusion. FIG. 1B shows another variation for assembling flats 16a which variation will be discussed below. In any event, the distance between the two parallel flats 16 (or 16a) should approximate the thickness of the wooden cross-piece 10 in the area where the mounting holes 26 are placed. This is not a critical dimension since some amount of slop will be taken up by the depth of the channel in channel pieces 28.

The other major portions of the timber-joining device are the channel pieces 28. It is the combination of these pieces 28, which have a channel or trough deep enough to allow the edges of the "U" to bite into the timber, with the frame 14 which gives the joint its strength and stability. Said another way, the depth of the 'U' channel in channel piece 28 must be greater than the thickness of flats 16 to utilize the advantages of the inventive device.

Figure 1C:
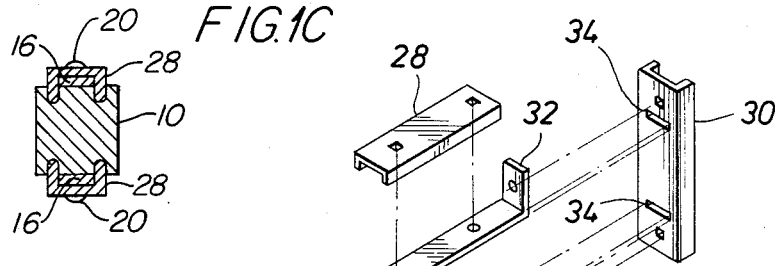
FIG. 1C shows an end view cross-section of the device shown in FIG. 1A, as assembled.
Figure 1B:
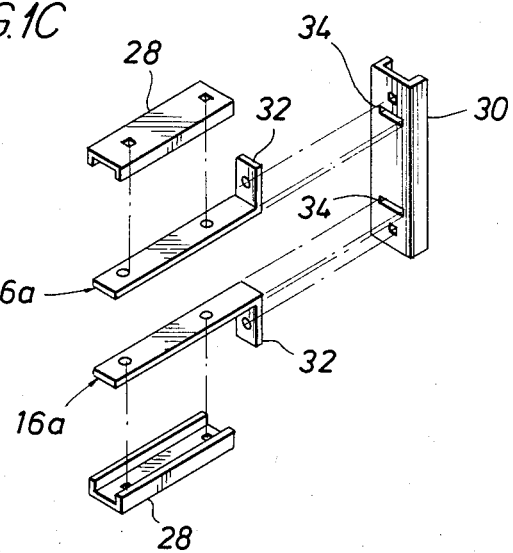
FIG. 1B shows an alternative construction of the connector in FIG. 1A.

As is shown in FIG. 1C, the edges of the channel pieces 28 bite into, or are imbedded into, the cross-piece 10. The flats 16 are squeezed against the cross-piece 10 by, e.g., bolts 20.

On a well-fitted device, support frame 14 substantially prevents up and down movement of cross-piece 10. Channel pieces 28, because of the contact (and possible penetration) of the outer edges of the 'U' channel with or into the wood cross-piece, e.g., 10, prevent side to side motion of the cross-piece.

FIG. 1B shows an alternative of the device using discrete parallel flats 16a. Flats 16a are generally 'L' shaped and configured so that the short end of the 'L' 32 fits through the slots 34 in vertical channel 30. The holes in the short end 32 of flat 16a and in channel 30 align to allow passage of a mounting bolt such as the bolts 22 shown in FIG. 1A.

The devices shown in FIGS. 1A and 1B allow the use of the outside surfaces of wood pieces 10 and 12, i.e., those surfaces to which the inventive joining devices are not attached, as working surfaces. If, for instance, wood pieces 10 and 12 are fence pieces, then pickets could be attached to cross-piece 10. If timber pieces 10 and 12 are used as wall supports and cross-pieces in a building, then sheathing and insulation can be installed on the outside of the timber pieces.

In contrast, the variations shown in top view in FIG. 2A through 2D do not provide the vertical working surface mentioned above. However, these joints may be used, for instance, on interior framing in housing structures where the horizontal timber surfaces are to be used for attachment of flooring or ceiling panels.

In FIG. 2A, a variation joining three horizontal timbers 10 with a single timber 12 is shown. This variation uses two 'L' shaped flats 36 and a single long flat 38. Channel pieces 28 are used at appropriate places and each uses dual cross bolts. A single long channel piece 40 may replace the single flat 38 and its two attendant channel pieces 28. At least one bolt 42 (or lag bolt), but preferably two (one not shown), must enter the vertical post 12. This variation, using the two 'L' shaped flats 36, is an alternative to the support bracket 14 shown in FIG. 1A.

FIG. 2B shows a top view of a variation of the inventive device joining two horizontal timbers 10 which butt against a single vertical timber 12. Two long flats 38 are used with appropriate channel pieces 28. Again, a long channel 40 may replace one or more of the combination of long flat 38 and two channel pieces 28. A tight fit between cross timbers 10 and vertical timber 12 always helps promote structural integrity in this as well as any other timber joining device.

FIG. 2C shows a top view of a variation of the inventive device which joins two horizontal timbers 10 meeting a single vertical timber 12. This variation uses a smaller 'L' shaped flat 36 on the inside of the joint and a longer or outer 'L' shaped flat 42 on the outside of the joint. The cross bolted channel pieces 28 provide up and down stability to horizontal timbers 10. Bolts 44 (either cross bolts or lag bolts) are staggered in outer 'L' shaped flat 42 to prevent interference inside timber 12.

The variation shown in FIG. 2D repeats the long flat 38 and two channel pieces 28 shown in FIG. 2A for joining three horizontal timbers 10 to a single vertical timber 12. However, instead of the two 'L' shaped flats 36 used in the variation of FIG. 2A a built up piece made up of a part similar to a long flat 46 and a long deep 'U' shaped flat 48 which fits snugly outside timber 10. The two parts must be joined in some manner, preferably by welding. The combination of flats 46 and 48 is a further alternative to support bracket 14 as shown in FIG. 1A.

FIG. 2E depicts, in side view, a variation of the inventive device using the support bracket 14 shown in FIG. 1A to join a vertical timber 12 with a horizontal timber 10. The cross bolts 22 are backed up by a single flat 50.

Similarly, and as is shown in FIG. 2F, a timber joining device using the support bracket 14 and its attendant channel pieces 28 may be used in conjunction with a device having discrete flats 52 to support an additional horizontal timber 10. Flats 52 are 'L' shaped and similar to those shown in FIGS. 2A and 2C differing, however, in the number of mounting holes used for cross bolting.

The 'L' shaped brackets or flats shown in FIG. 2A and 2C (#36) and in FIG. 2F (#52) may, of course, be produced at an angle other than a right angle. The resulting joint may result in a timber in or out of the Figures or right or left from the depicted positions. The timbers should be cut at an angle to allow the timber end to fit flush against the adjoining timber.

The versatility of this invention is demonstrated by the variations shown in side view in FIGS. 2G and 2H. These two variations may be used for joining timbers used, for instance, as roof supports in a housing structure.

In FIG. 2G, a ridge beam 54 is joined to roof joists 56 using inventive timber joining devices 58 similar to those shown variously in FIGS. 2A, 2D, 2E, and 2F modified by joining the flats at an angle other than a right angle. Similarly, FIG. 2H shows the use of those same inventive devices joining a roof joist 56 to a wall cross beam 60.

Uses other than those disclosed will be apparent to those having ordinary skill in this art. For instance, each of these variations may be used to attach a timber to a plate or other flat surface.

It should be apparent that although the variations described above have been discussed in terms of "horizontal" and "vertical" timbers for the purpose of clarity, the inventive devices are operative no matter what the position the timbers are placed—vertical, horizontal, and any position therebetween.

It should also be apparent that the foregoing description is only illustrative of the invention and is not intended to limit the scope of coverage. Various changes to the form, details, arrangement, and proportions of the disclosed parts without departing from the spirit of the invention as claimed in the following claims.

I claim as my invention:

1. Means for joining the end of a timber having a longitudinal axis to at least one second member, comprising:
   a support frame having two support arms which are adapted to lie along opposite sides of said timber and generally along said timber longitudinal axis, said arms adapted to be fastened to said timber with at least one support fastener,
   at least one frame end fastened to said two support arms and adapted to be fastened to said at least one second member, and
   a shallow U-shaped channel positioned around each support arm and having an open side and a back side, said open side providing a trough which is slightly deeper than the thickness of the surrounded support arm and the trough generally abutting the edges of the surrounded support arm, each channel adapted to be fastened to said timber with said at least one support fastener with its open side toward said timber.

2. The means of claim 1 wherein the support arms are L-shaped with a long end and a short end, said long end adapted to fit within said shallow U-shaped channel and said short end adapted to fit through a slot in and thereunto an open side of a shallow U-shaped frame end.

3. The means of claim 1 wherein the support arms are welded to a generally flat frame end.

4. The means of claim 1 wherein the support arms are welded to the back side of a shallow U-shaped frame end having a back side and an open side.

5. The means of claim 1 wherein said at least one second member comprise at least one timber.

6. The means of claim 1 wherein said at least one second member comprises at least one plate.

7. The means of claim 1 wherein said support arms are generally perpendicular to the frame end.

8. The means of claim 1 wherein said support arms are not perpendicular to the frame end.

9. The means of claim 1 wherein said support fasteners comprise carriage bolts and nuts.

10. Means for joining the end of a timber having a longitudinal axis to at least one second member, comprising:
    two support arms having a first part and a second part joined in the form of an 'L', said first arm part adapted to lie along opposite sides of said timber and generally along said timber longitudinal axis, said first arm part adapted to be fastened to said timber with at least one support fastener, said second arm part adapted to be fastened to said at least one second member, and
    a shallow U-shaped channel positioned around each first arm part and having an open side providing a trough which is slightly deeper than the thickness of the surrounded first arm and the trough generally abutting the edges of the surrounded first arm part, each channel adapted to be fastened to said timber with said at least one support fastener with its open side toward said timber.

11. The means of claim 10 wherein each said second arm part are adapted to be bolted to said at least one second member.

12. The means of claim 10 wherein each said second arm part are adapted to fit under a shallow U-shaped frame end and each said second arm part and said shallow U-shaped frame end are adapted to be fastened to said at least one second member with a single fastening means.

13. The means of claim 10 wherein said at least one second member comprise at least one timber.

14. The means of claim 10 wherein each said at least one second member comprises at least one plate.

15. The means of claim 10 wherein each said first arm part is generally perpendicular to each said second arm part.

16. The means of claim 10 wherein said first arm part is not perpendicular to each said second arm part.

17. The means of claim 10 wherein said support fasteners comprise carriage bolts and nuts.

18. Means for joining the end of a first timber having a longitudinal axis to at least one second member, comprising:
    a support frame having two support arms which are adapted to lie along opposite sides of said first timber and generally along said first timber longitudinal axis, said arms adapted to be fastened to said first timber with at least one support fastener at least one flat frame end welded to said two support arms and adapted to be fastened to said at least one second member, and
    a shallow U-shaped channel positioned around each support arm and having an open side and a back side, said open side providing a trough which is slightly deeper than the thickness of the surrounded arm and the trough generally abutting the edges of the surrounded support arm, each channel adapted to be fastened to said first timber with said at least one support fastener with its open side toward said first timber.

* * * * *